United States Patent
Scoda

(10) Patent No.: US 10,198,414 B2
(45) Date of Patent: Feb. 5, 2019

(54) METHODS FOR OPTIMIZING INTERACTION WITH A FORM IN A WEBSITE PAGE AND SYSTEMS THEREOF

(75) Inventor: Enrico Scoda, Martignacco (IT)

(73) Assignee: USABLENET INC., New York, NY (US)

( * ) Notice: Subject to any disclaimer, the term of this patent is extended or adjusted under 35 U.S.C. 154(b) by 478 days.

(21) Appl. No.: 12/584,697

(22) Filed: Sep. 10, 2009

(65) Prior Publication Data

US 2011/0060997 A1    Mar. 10, 2011

(51) Int. Cl.
  *G06F 17/24* (2006.01)
  *G06F 17/30* (2006.01)

(52) U.S. Cl.
  CPC ...... *G06F 17/243* (2013.01); *G06F 17/30905* (2013.01); *G06F 17/3089* (2013.01); *G06F 17/30899* (2013.01)

(58) Field of Classification Search
  CPC .......................... G06F 17/30905; G06F 17/243
  USPC .................................................. 715/738, 744
  See application file for complete search history.

(56) References Cited

U.S. PATENT DOCUMENTS

| | | | | |
|---|---|---|---|---|
| 5,862,325 A * | 1/1999 | Reed et al. | | 709/201 |
| 6,957,390 B2 * | 10/2005 | Tamir et al. | | 715/744 |
| 7,127,503 B2 * | 10/2006 | Malrnskog | | 709/219 |
| 7,188,315 B2 * | 3/2007 | Chen et al. | | 715/764 |
| 7,206,791 B2 * | 4/2007 | Hind et al. | | |
| 7,225,462 B2 * | 5/2007 | Bass et al. | | 726/6 |
| 7,287,228 B2 * | 10/2007 | Kundu et al. | | 715/745 |
| 7,346,843 B2 * | 3/2008 | Hind et al. | | 715/234 |
| 7,385,605 B2 * | 6/2008 | Twait | | 345/440 |
| 7,451,131 B2 * | 11/2008 | Curtis et al. | | |
| 7,506,260 B2 * | 3/2009 | Wada et al. | | 715/738 |
| 7,523,158 B1 * | 4/2009 | Nickerson et al. | | 709/203 |
| 7,581,174 B2 * | 8/2009 | Makela | | 715/238 |
| 7,631,270 B2 * | 12/2009 | Cunningham et al. | | 715/772 |
| 7,636,922 B2 * | 12/2009 | Odins-Lucas et al. | | 719/328 |
| 7,640,505 B1 * | 12/2009 | Edmunds | | 715/744 |
| 7,653,617 B2 * | 1/2010 | Strohm et al. | | 707/999.003 |
| 7,739,274 B2 * | 6/2010 | Curtis et al. | | 707/723 |
| 7,925,548 B2 * | 4/2011 | Alger et al. | | 705/26.1 |
| 7,975,000 B2 * | 7/2011 | Dixon et al. | | 709/203 |
| 7,984,048 B2 * | 7/2011 | Curtis et al. | | 707/728 |
| 7,996,391 B2 * | 8/2011 | Castro et al. | | 707/723 |

(Continued)

OTHER PUBLICATIONS

International Search Report and Written Opinion for International Patent Application No. PCT/US2010/048282 (dated Oct. 27, 2010).

(Continued)

*Primary Examiner* — Jeffrey A Gaffin
*Assistant Examiner* — John M Heffington
(74) *Attorney, Agent, or Firm* — LeClairRyan PLLC

(57) ABSTRACT

A method, computer readable medium and system that optimizes interaction with a form of a website page includes retrieving with a web content optimization computing device an original website page with a form in response to a request from a requesting system. The web content optimization computing device stores at least the form of the original website page and adjusts at least one field control of the form to generate a simplified website page. The web content optimization computing device provides the simplified website page to the requesting system.

21 Claims, 8 Drawing Sheets

(56) References Cited

U.S. PATENT DOCUMENTS

| | | | |
|---|---|---|---|
| 7,996,757 B2* | 8/2011 | Hind et al. | 715/205 |
| 8,037,087 B2* | 10/2011 | Curtis et al. | 707/769 |
| 8,065,299 B2* | 11/2011 | Curtis et al. | 707/727 |
| 8,099,660 B1* | 1/2012 | O'Sullivan et al. | 715/200 |
| 8,234,266 B2* | 7/2012 | Strohm et al. | 707/709 |
| 8,286,086 B2* | 10/2012 | Sampson et al. | 715/760 |
| 2002/0131404 A1* | 9/2002 | Mehta | G06F 8/61 370/352 |
| 2003/0018543 A1* | 1/2003 | Alger et al. | 705/27 |
| 2003/0145281 A1* | 7/2003 | Thames et al. | 715/513 |
| 2003/0145282 A1* | 7/2003 | Thomas et al. | 715/513 |
| 2003/0145310 A1* | 7/2003 | Thames et al. | 717/123 |
| 2003/0163801 A1* | 8/2003 | Thames et al. | 717/123 |
| 2004/0098414 A1* | 5/2004 | Chan et al. | 707/200 |
| 2004/0177315 A1 | 9/2004 | Brown et al. | |
| 2004/0186817 A1* | 9/2004 | Thames et al. | 707/1 |
| 2004/0189713 A1* | 9/2004 | Thames et al. | 345/810 |
| 2004/0199516 A1* | 10/2004 | Thames et al. | 707/100 |
| 2004/0249487 A1* | 12/2004 | Ahlert et al. | 700/83 |
| 2005/0021858 A1* | 1/2005 | Ruston et al. | 709/246 |
| 2005/0065860 A1* | 3/2005 | Alger et al. | 705/27 |
| 2005/0097007 A1* | 5/2005 | Alger et al. | 705/26 |
| 2005/0097160 A1* | 5/2005 | Stob | 709/200 |
| 2005/0120312 A1* | 6/2005 | Nguyen | 715/863 |
| 2005/0273758 A1* | 12/2005 | Long | 717/101 |
| 2006/0030388 A1* | 2/2006 | Kane et al. | 463/16 |
| 2006/0031779 A1* | 2/2006 | Theurer et al. | 715/781 |
| 2006/0059437 A1* | 3/2006 | Conklin, III | 715/800 |
| 2006/0069733 A1* | 3/2006 | Antonoff et al. | 709/206 |
| 2006/0123334 A1 | 6/2006 | Balasubramanyan et al. | |
| 2006/0271671 A1 | 11/2006 | Hansen | |
| 2007/0094076 A1* | 4/2007 | Perkowski et al. | 705/14 |
| 2007/0168465 A1* | 7/2007 | Toppenberg et al. | 709/218 |
| 2007/0260495 A1* | 11/2007 | Mace et al. | 705/5 |
| 2008/0021778 A1* | 1/2008 | Perkowski et al. | 705/14 |
| 2008/0034314 A1* | 2/2008 | Louch et al. | 715/778 |
| 2008/0040684 A1* | 2/2008 | Crump | 715/808 |
| 2008/0109327 A1* | 5/2008 | Mayle et al. | 705/27 |
| 2008/0139191 A1* | 6/2008 | Melnyk et al. | 455/419 |
| 2008/0184102 A1* | 7/2008 | Selig | G06F 17/243 715/234 |
| 2008/0209336 A1* | 8/2008 | Brown et al. | 715/744 |
| 2008/0244414 A1* | 10/2008 | Marcoullier et al. | 715/738 |
| 2008/0301231 A1* | 12/2008 | Mehta | G06F 8/61 709/204 |
| 2009/0006179 A1* | 1/2009 | Billingsley et al. | 705/10 |
| 2009/0094137 A1* | 4/2009 | Toppenberg et al. | 705/27 |
| 2009/0106104 A1* | 4/2009 | Upendran et al. | 705/14 |
| 2009/0106315 A1* | 4/2009 | Upendran et al. | 707/104.1 |
| 2009/0119329 A1* | 5/2009 | Kwon et al. | 707/102 |
| 2009/0176580 A1* | 7/2009 | Herrmann et al. | 463/43 |
| 2009/0191962 A1* | 7/2009 | Hardy et al. | 463/29 |
| 2009/0228840 A1* | 9/2009 | Stach | G06F 3/038 715/854 |
| 2009/0248608 A1* | 10/2009 | Ravikumar et al. | 706/55 |
| 2009/0298594 A1* | 12/2009 | Pueyo et al. | 463/42 |
| 2010/0066763 A1* | 3/2010 | MacDougall et al. | 345/656 |
| 2010/0107123 A1* | 4/2010 | Sareen et al. | 715/835 |
| 2010/0110080 A1* | 5/2010 | Goodinson | 345/467 |
| 2010/0211467 A1* | 8/2010 | Ramanathan | 705/14.72 |
| 2010/0241516 A1* | 9/2010 | Kim et al. | 705/14.73 |
| 2010/0325543 A1* | 12/2010 | Williams et al. | 715/716 |
| 2011/0106729 A1* | 5/2011 | Billingsley et al. | 705/36 R |
| 2011/0111855 A9* | 5/2011 | Hardy et al. | 463/42 |
| 2011/0173526 A1* | 7/2011 | Schwarzbauer et al. | 715/234 |

OTHER PUBLICATIONS

Canadian Office Action for Canadian Application No. 2,773,088 dated Aug. 22, 2016, pp. 1-4.

Canadian Office Action for Canadian Application No. 2,773,088 dated Jul. 4, 2017, pp. 1-3.

European Search Report for EP Application No. 10816083.9, dated Jan. 23, 2018, pp. 1-6.

* cited by examiner

```
1  ▷ <html>
2  ▷ <head>
3       <title>Address Form</title>
4     </head>
5  ▷ <body>
6  ▷   <form action="submit_address.php">
7  ▷     <div id="address_block">
8  ▷       <input type="hidden" name="$address_block$status_hidden_field"
9             value="ags732h4hsh2kek2hysgkjeh2y437h2383y37sgwy7"/>
10 ▷       <input type="hidden" name="$address_block$arrival_date_hidden_field"     56
11            value="10/03/2008"/>
12 ▷       <input type="hidden" name="$address_block$departure_date_hidden_field"   58
13            value="10/05/2008"/>
14 ▷       <input type="hidden" name="$address_block$room_type_hidden_field"        60
15            value="superior"/>
16         Name:<br/>                                                                62
17         <input type="text" name="$address_block$name_text_hidden_field"/><br/>   52
18         Surname:<br/>
19         <input type="text" name="$address_block$surname_text_field"/><br/>       54
20         <input type="submit" value="go"/>
21       <div/>
22     </form>
23   </body>
24 </html>
```

*FIG. 4A*

%24address_block%24status_hidden_field=ags732h4hsh2kek2hysgkjeh2y437h2383y37sgwy7&
%24address_block%24arrival_date_hidden_field=10%2F03%2F2008&
%24address_block%24departure_date_hidden_field=10%2F05%2F2008&
%24address_block%24room_type_hidden_field=superior&
%24address_block%24name_text_field=John&%24address_block%24surname_text_field=Smith

*FIG. 4B*

```
1   <html>
2       <head>
3           <title>Address Form</title>
4       </head>
5       <body>
6           <form action="submit_address.php">
7               <div id="address_block">
8                   Name:<br/>
9                   <input type="text" name="_1"/><br/>         ← 64
10                  Surname:<br/>
11                  <input type="text" name="_2"/><br/>         ← 66
12                  <input type="submit" value="go"/>
13                  <input type="hidden" name="un_jtt_pid" value="n+16263748172+0"/>
14              <div/>
15          </form>
16      </body>
17  </html>
```

*FIG. 5A*

_1=John&_2=Smith&un_jtt_pid=n+16263748172+0      ← 67

*FIG. 5B*

METHODS FOR OPTIMIZING INTERACTION WITH A FORM IN A WEBSITE PAGE AND SYSTEMS THEREOF

FIELD OF THE INVENTION

This invention generally relates methods and systems for managing website transactions and, more particularly, methods for optimizing a form in a website page for mobile and other devices with limited memory and network capabilities.

BACKGROUND

Any website transaction, such as a hotel booking, flight check in, or concert ticket purchase, is usually broken into a series of steps which must be executed. Each step is represented by a website page containing a form a user must fill with relevant data useful to complete a task. Often these website form pages contain a number of text fields for the user to complete along with several hidden fields. Hidden fields are special website form page markup elements that contain relevant information to be transmitted between the website pages, i.e. transaction steps that must take place, but do not need to be shown to or require interaction from the user.

A web application framework is a software framework designed to support the development of dynamic websites, web applications and web services. The framework aims to alleviate overhead associated with common activities used in web development. Some of these web application frameworks keep a large amount of data inside hidden fields to save a status of the website transaction. These frameworks also automatically generate form field names which can be quite long. For example, a form field name can represent the element position inside the document by including the names of all the elements containing it.

When mobile and other devices with limited memory and network capabilities, such as smart phones and personal digital assistants, try to process a website form page built in such a manner, these devices must download a heavy weight website page, load the page and process the page in memory. When the user has entered data into the website form page, these devices also must send the website form page with the entered data along with data stored inside hidden fields back to the originating web application server for this transaction to proceed to the next step. With mobile and other devices with limited memory and network capabilities, the execution of these steps can be quite slow.

SUMMARY

A method for optimizing interaction with a form in a website page in accordance with embodiments of the present invention includes retrieving with a web content optimization computing device an original website page with a form in response to a request from a requesting system. The web content optimization computing device stores at least the form of the original website page and adjusts at least one field control of the form to generate a simplified website page. The web content optimization computing device provides the simplified website page to the requesting system.

A computer readable medium in accordance with other embodiments of the present invention includes having stored thereon instructions for optimizing interaction with a form in a website page comprising machine executable code which when executed by at least one processor, causes the processor to perform steps including retrieving an original website page with a form in response to a request. At least the form of the original website page is stored and at least one field control of the form is adjusted to generate a simplified website page. The simplified website page is provided in response to the request.

A web page form optimization system in accordance with other embodiments of the present invention includes an interface system, a storage system, and an optimization processing system in a web content optimization computing device. The interface system retrieves an original website page with a form in response to a request from a requesting system and the storage system stores at least the form of the original website page. The optimization processing system adjusts at least one field control in the form to generate a simplified website form page. The interface system provides the simplified website page to the requesting system.

Accordingly, the present invention provides methods and systems to optimize interaction with a form in a website page with mobile and other devices with limited memory and network capabilities. The optimized form in the website page provided to these devices has substantially less markup code by removing hidden fields and shortening field control names from the form making them easier and quicker to load and process. Additionally, once fields in these optimized forms are completed with data, the resulting completed forms can more easily be transmitted back to complete the transaction step. With the present invention, these operations all take place quickly, seamlessly and without the knowledge of the end user.

BRIEF DESCRIPTION OF THE DRAWINGS

FIG. 4A is exemplary HTML code describing the form of the website page shown in FIG. 3 with four hidden fields;

FIG. 4B is an exemplary HTTP request body resulting from the submission of the form of the website page shown in FIG. 3 and described by the code of FIG. 4A having "John" as the data entered in the first text box and "Smith" as the data entered in the second text box;

FIG. 5A is an exemplary HTML code describing the form of the website page shown in FIG. 3 after applying the method for optimizing a form of a website page in accordance with embodiments of the present invention;

FIG. 5B is an exemplary HTTP request body resulting from the submission of the form of the website page shown in FIG. 3 and described by the code of FIG. 5A having "John" as the data entered in the first text box and "Smith" as the data entered in the second text box;

DETAILED DESCRIPTION

Figure 1:
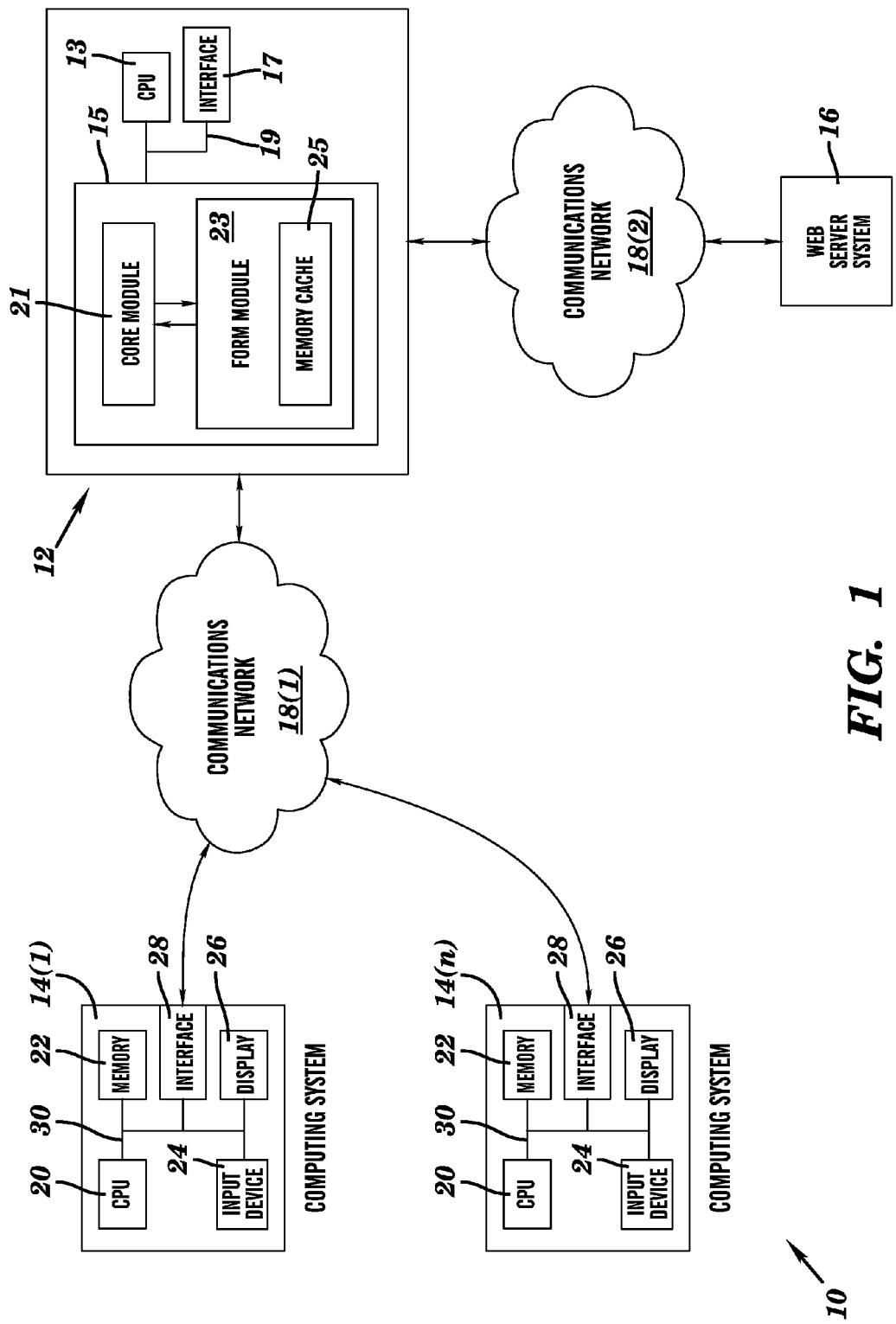
FIG. 1 is a block diagram of system in which a form of a website page is optimized in accordance with embodiments of the present invention.

A system 10 in which a form of a website page is optimized in accordance with embodiments of the present invention is illustrated in FIG. 1. The system 10 includes a web content optimization computing device 12, client computing devices 14(1)-14(n), a web server system 16, and communication networks 18(1)-18(2), although other numbers and types of systems, devices, and/or elements in other configurations can be used. The present invention provides a number of advantages including methods and systems to optimize interaction with website form pages when delivering content to and receiving content from mobile and other devices with limited memory and network capabilities.

Referring more specifically to FIG. 1, the web content optimization computing device 12 enables the optimization of a form of a website page, although the web content optimization computing device 12 can provide other numbers and types of functions. Although one web content optimization computing device 12 is shown, other numbers and types of web content optimization systems can be used.

The web content optimization computing device 12 includes a central processing unit (CPU) or processor 13, a memory 15, and an interface system 17 which are coupled together by a bus 19 or other link, although other numbers and types of components, parts, devices, systems, and elements in other configurations and locations can be used. The processor 13 in the web content optimization computing device 12 executes a program of stored instructions one or more aspects of the present invention as described and illustrated by way of the embodiments herein, including methods for optimizing interaction with website form pages, although the processor could execute other numbers and types of programmed instructions.

The memory 15 in the web content optimization computing device 12 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 13, can be used for the memory 15 in the web content optimization computing device 12. In these embodiments, the memory 15 includes a core module 21, a form module 23, and a memory cache 25 which store programmed instructions for one or more aspects of the present invention as described and illustrated herein and some or all of original website form pages, although the memory can comprise other types and numbers of systems, devices, and elements in other configurations which store other data.

The interface system 17 in the web content optimization computing device 12 is used to operatively couple and communicate between the web content optimization computing device 12 and the client computing devices 14(1)-14(n) and the web server system 16 via the communication networks 18(1) and 18(2), although other types and numbers of communication networks with other types and numbers of connections and configurations can be used. By way of example only, the communication networks 18(1) and 18(2) can use TCP/IP over Ethernet and industry-standard protocols, including HTTP, HTTPS, WAP, and SOAP, although other types and numbers of communication networks, such as a direct connection, a local area network, a wide area network, modems and phone lines, e-mail, and wireless and hardwire communication technology, each having their own communications protocols, can be used.

Each of the client computing devices 14(1)-14(n) enables a user to access content and utilize one or more applications from the web server system 16 through the web content optimization computing device 12 through one or more communication networks, although one or more of the client computing devices 14(1)-14(n) could access content and utilize other types and numbers of applications from other sources and could provide a wide variety of other functions for the user. Although multiple client computing devices 14(1)-14(n) are shown, other numbers and types of user computing systems could be used. In this example, the client computing devices 14(1)-14(n) comprise mobile devices with Internet access that permit a website form page or other retrieved data to be displayed, although each of the client computing devices 14(1)-14(n). By way of example only, one or more of the client computing devices 14(1)-14(n) can comprise smart phones, personal digital assistants, or desktop computers using visual or voice browsers.

Each of client computing devices 14(1)-14(n) includes a central processing unit (CPU) or processor 20, a memory 22, user input device 24, a display 26, and an interface system 28, and which are coupled together by a bus 30 or other link, although one or more of client computing devices 14(1)-14(n) can include other numbers and types of components, parts, devices, systems, and elements in other configurations. The processor 20 in each of client computing devices 14(1)-14(n) executes a program of stored instructions for one or more aspects of the present invention as described and illustrated herein, although the processor could execute other numbers and types of programmed instructions.

The memory 22 in each of the client computing devices 14(1)-14(n) stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to processor 20 can be used for the memory 22 in each of the client computing devices 14(1)-14(n).

The user input device 24 in each of the client computing devices 14(1)-14(n) is used to input selections, such as requests for a particular website form page or to enter data in fields of a form page, although the user input device could be used to input other types of data and interact with other elements. The user input device can include a keypads, touch screens, and/or vocal input processing systems although other types and numbers of user input devices can be used.

The display 26 in each of the client computing devices 14(1)-14(n) is used to show data and information to the user, such as website form page by way of example only. The display in each of the client computing devices 14(1)-14(n) is a phone screen display, although other types and numbers of displays could be used.

The interface system 28 in each of the client computing devices 14(1)-14(n) is used to operatively couple and communicate between the client computing devices 14(1)-14(n) and the web content optimization computing device 12 and web server system 16 over the communication networks 18(1) and 18(2), although other types and numbers of communication networks with other types and numbers of connections and configurations can be used.

The web server system 16 provides one or more web software applications for use by one or more of the client computing devices 14(1)-14(n), although the web server system 16 can provide other numbers and types of applications and/or content and can have provide other numbers and types of functions. Although one web server system 16 is shown for ease of illustration and discussion, other numbers and types of web server systems and devices can be used.

The web server system 16 includes a central processing unit (CPU) or processor, a memory, and an interface system which are coupled together by a bus or other link, although the web server system 16 could have other numbers and types of components, parts, devices, systems, and elements in other configurations and locations can be used. The processor in the web server system 16 executes a program of stored instructions one or more aspects of the present invention as described and illustrated by way of the embodiments herein, including managing application functionality, although the processor could execute other numbers and types of programmed instructions.

The memory in the web server system 16 stores these programmed instructions for one or more aspects of the present invention as described and illustrated by way of the embodiments herein including managing application functionality, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in each of the web server system 16.

The interface system in the web server system 16 is used to operatively couple and communicate between the web server system 16 and the web content optimization computing device 12 and the client computing devices 14(1)-14(n) via communication networks 18(1) and 18(2), although other types and numbers of communication networks with other types and numbers of connections and configurations can be used.

Although embodiments of the web content optimization computing device 12, the client computing devices 14(1)-14(n), and the web server system 16, are described and illustrated herein, each of the client computing devices 14(1)-14(n), the web content optimization computing device 12, and the web server system 16, can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, digital signal processors, and micro-controllers, programmed according to the teachings of the embodiments, as described and illustrated herein, and as will be appreciated by those ordinary skill in the art.

In addition, two or more computing systems or devices can be substituted for any one of the systems in any embodiment of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

Figure 2:
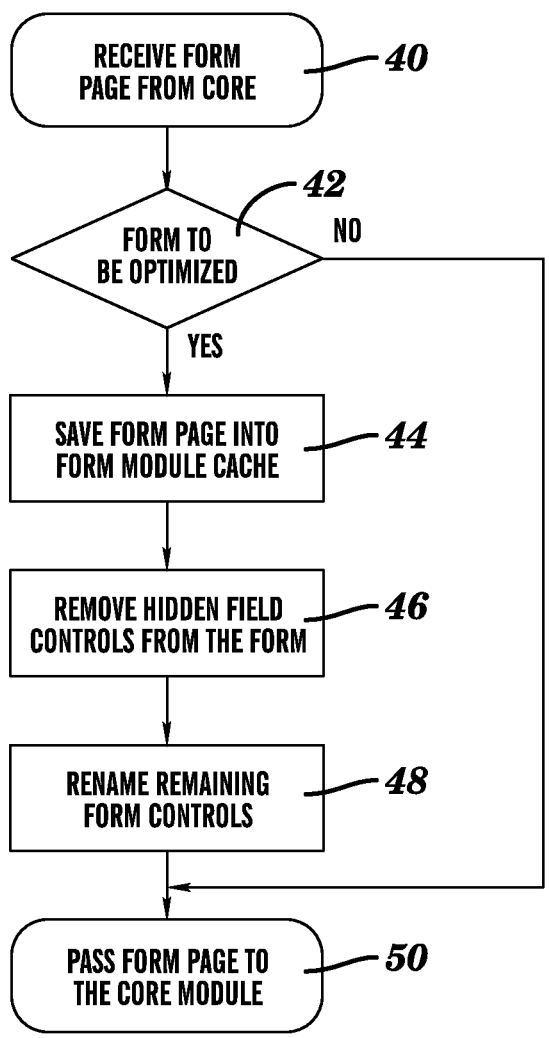
FIG. 2 is a flow chart of a method for optimizing a form of a website page in accordance with embodiments of the present invention.
Figure 3:
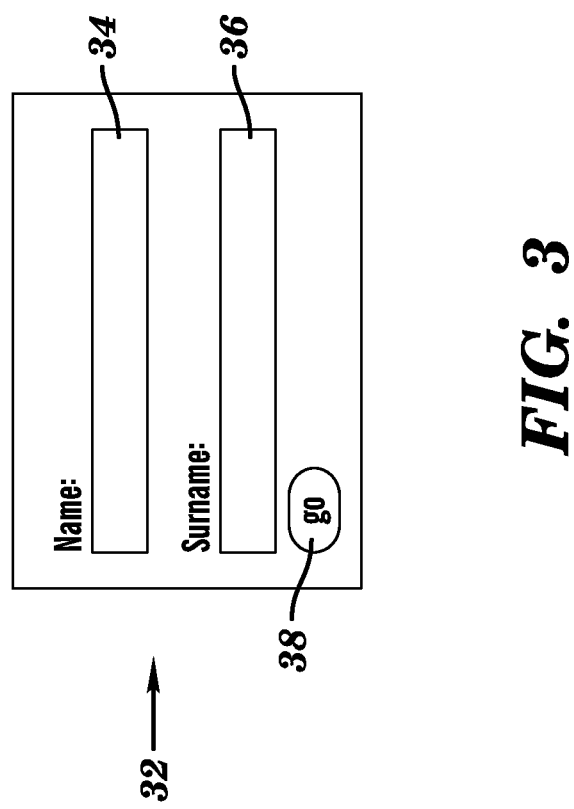
FIG. 3 is an exemplary form of a website page containing two text fields and a submit button.

A method of optimizing a form of a website page in accordance with embodiments of the present invention will now be described with reference to FIGS. 1-5B. Referring more specifically to FIG. 2, in step 40 one of the client computing devices 14(1) transmits a Hyper Text Transfer Protocol (HTTP) request that specifies a Uniform Resource Locator (URL) to the web content optimization computing device 12 via communication network 18(1) which in turn transmits this request to the appropriate web server system 16 via communication network 18(2), although other manners for obtaining a website page can be used. The web server system 16 process the received request and transmits the requested website page back to the web content optimization computing device 12, although other types of pages and other data could be provided back in response to the request. By way of example only, a form 32 in the website page retrieved in response to this request contains a text field for Name 34, a text field for Surname 36 and a submit button 38 is illustrated in FIG. 3, although the page could have other numbers and types of fields and other elements.

In step 42, the web content optimization computing device 12 determines whether the retrieved website page has a form to optimize. If in step 42 the web content optimization computing device 12 determines the retrieved website page does not have a form to optimize, then the No branch is taken to step 50 where the retrieved website page is passed from the web content optimization computing device 12 to the requesting one of the client computing devices 14(1)-14(n). If in step 42 the web content optimization computing device 12 determines the retrieved website page does have a form to optimize, then the Yes branch is taken to step 44.

In step 44, the web content optimization computing device 12 stores code for at least the form of retrieved website page in memory, although the web content optimization computing device 12 or other devices could store other types and amounts of data, such as code for the form along with the original website page.

Additionally, in step 44, the web content optimization computing device 12 adds a new hidden field with attribute name equal to un_jtt_pid to the form of the retrieved website page, although other types and numbers of parameters or other identifiers can be added. The value attribute of un_jtt_pid hidden field control contains identification and other information to locate at least the code for the form of the retrieved website page from memory 15 of the web content optimization computing device 12.

In step 46, the web content optimization computing device 12 identifies any hidden field controls for the form, although other types of controls or other information could be identified. The web content optimization computing device 12 removes the identified hidden field controls from code for the form of the original retrieved website page, although other types and numbers of modifications to the identified hidden field controls could be executed.

In step 48, the web content optimization computing device 12 identifies any remaining field controls for the form, although other types of controls or other information could be identified. The web content optimization computing device 12 generates a shorter name for the identified remaining field controls and replaces the initial name for each of the remaining field controls with the generated shorter name, although other types and numbers of modifications to the initial name of one or more of the remaining field controls could be executed. By way of example, in these embodiments the shorter name is generated by a '_' character followed by a number indicating the control position in the form, although other ways to generate the shorter or simpler name could be used.

Next, in step 50 if the retrieved website page had a form, then the simplified website page with the form is passed from the web content optimization computing device 12 to the requesting one of the client computing devices 14(1)-14(n).

Referring to FIG. 4A, an example of the form of the website page shown in FIG. 3 described by HTML language or code without the method for optimizing a form of a website page in accordance with embodiments of the present invention is illustrated. The text fields 34 and 36 shown in FIG. 3 are described by long name attributes 52 and 54 in FIG. 4A. Additionally, the HTML language illustrated in FIG. 4A for the form of the original website page includes four hidden field controls 56, 58, 60 and 62. As described earlier, these hidden field controls typically are used to keep state information across multiple website pages, although they could have other functions. As illustrated in FIG. 4A, the hidden field controls 56, 58, 60 and 62 can be quite long, by way of example only some can be thousands characters long and some web applications will set the name attribute to a string containing the identification attribute of each element containing the form field control.

Referring to FIG. 4B, an exemplary HTTP request body resulting from the submission of the form of the website page shown in FIG. 3 and described by the code of FIG. 4A having "John" as the data entered in the first text box 34 in FIG. 3 and "Smith" as the data entered in the second text box 36 in FIG. 3. In these embodiments, the HTTP POST method is used to submit this data and the HTTP request body contains the encoded version of each control name attribute followed by the '=' character and the encoded version of its value attribute. Additionally, in this example the name/value pairs of each hidden field control are followed by the name value pairs of name and surname text controls.

Referring to FIG. 5A, exemplary HTML code describing the form of the website page shown in FIG. 3 after applying the method for optimizing a form of a website page in accordance with embodiments of the present invention is illustrated. As illustrated, the text fields 34 and 36 shown in FIG. 3 are now described by very short name attributes 64 and 66. Additionally, the four hidden field controls 56, 58, 60, and 62 have been removed after being saved in memory 15 in the web content optimization computing device 12. The hidden field 64 with attribute name equal to un_jtt_pid has been added. The value attribute of un_jtt_pid hidden field control contains identification and other information to locate at least the code for the form of the retrieved website page from memory 15 of the web content optimization computing device 12. Accordingly, with the present invention, the HTML code for the website page with the form is simplified and substantially reduced which accelerates the downloading and processing of the simplified website page with the form.

Referring to FIG. 5B, is an exemplary HTTP request body resulting from the submission of the form of the website page shown in FIG. 3 and described by the code of FIG. 5A having "John" as the data entered in the first text box 34 and "Smith" as the data entered the second text box 36 in FIG. 3. When the form is completed, the submit button 38 is engaged to transmit this request body with the entered data to the web content optimization device 14. As illustrated in FIG. 5B, simplifying the exemplary HTML code describing the form of the website page as illustrated in FIG. 5A by applying the method for optimizing a form of a website page in accordance with embodiments of the present invention results in a much smaller HTTP request body, than without the present invention as previously described and illustrated with respect to FIG. 4B.

Figure 6:
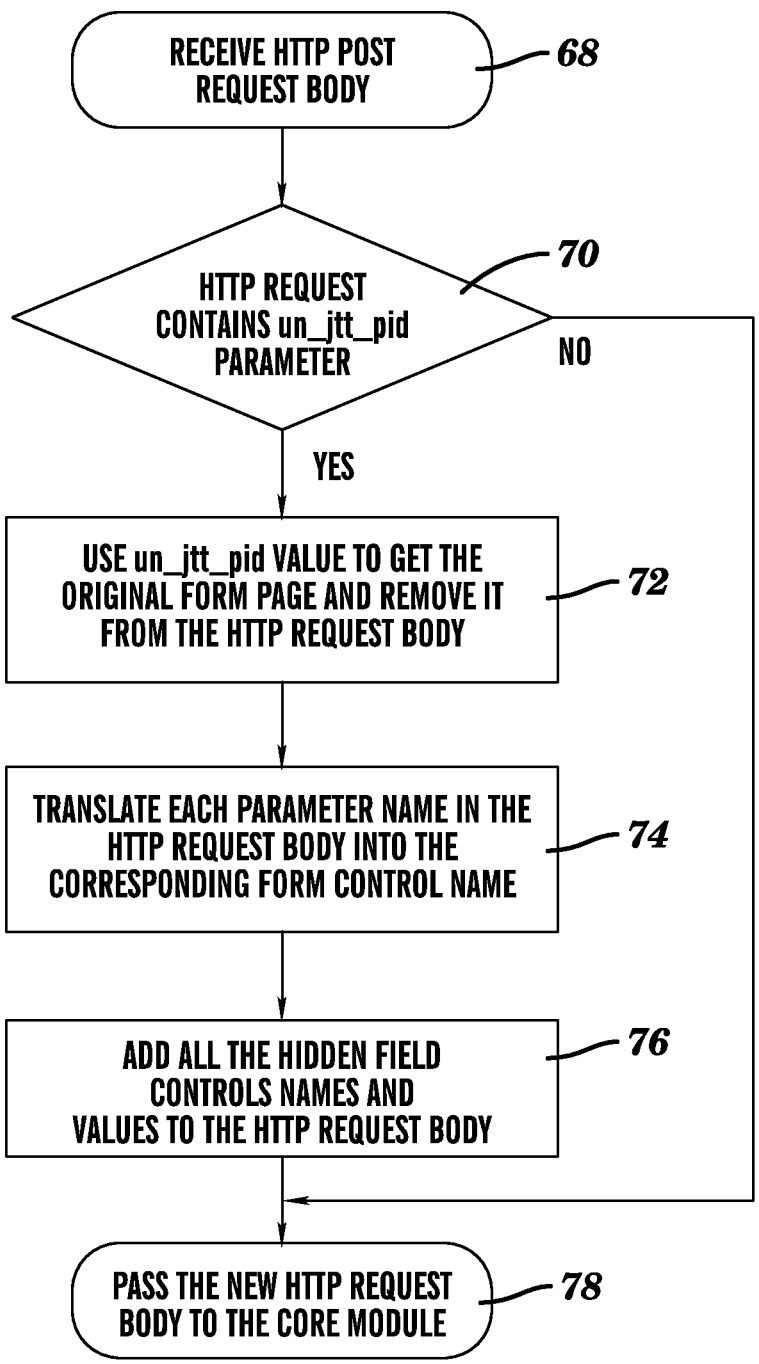
FIG. 6 is a flow chart of a method for processing an HTTP request body in accordance with embodiments of the present invention.

Referring to FIG. 6, a method for processing an HTTP request body in accordance with embodiments of the present invention is illustrated. In step 68, the web content optimization computing device 12 receives the HTTP request body with data entered, such as the one illustrated in FIG. 5B by way of example only.

In step 70, the web content optimization computing device 12 determines whether the received HTTP request body contains the un_jtt_pid parameter, although other types and numbers of identifiers could be used. If in step 70 the web content optimization computing device 12 determines the received HTTP request body does not contain the un_jtt_pid parameter, then the No branch is taken to step 78 where the received HTTP request body is transmitted to the web server system 16 or other source of the original web page. If in step 70 the web content optimization computing device 12 determines the received HTTP request body does contain the un_jtt_pid parameter, then the Yes branch is taken to step 72.

In step 72, the web content optimization computing device 12 uses the un_jtt_pid parameter to identify the original website page with the form in memory 15 in the web content optimization computing device 12, although the information could be retrieved from other locations in other manners. Additionally, the web content optimization computing device 12 removes the un_jtt_pid parameter from the received HTTP request body.

In step 74, the web content optimization computing device 12 identifies the field controls which were renamed, retrieves the initial names from in memory 15 in the web content optimization computing device 12, and replaces the shortened or simplified names with the original corresponding initial names, although other manners for replacing some or all of the names can be used.

In step 76, the web content optimization computing device 12 identifies the hidden field controls which were removed, retrieves the hidden field controls from in memory 15 in the web content optimization computing device 12, and adds the retrieved hidden field controls back in the received HTTP request body, although other manners for reinstating some or all of this data can be used.

In step 78, when the received HTTP request body contains the un_jtt_pid parameter, the web content optimization computing device 12 transmits the received HTTP request body with the replaced names and hidden field controls to the web server system 16 or other source of the original web page.

Figure 7:
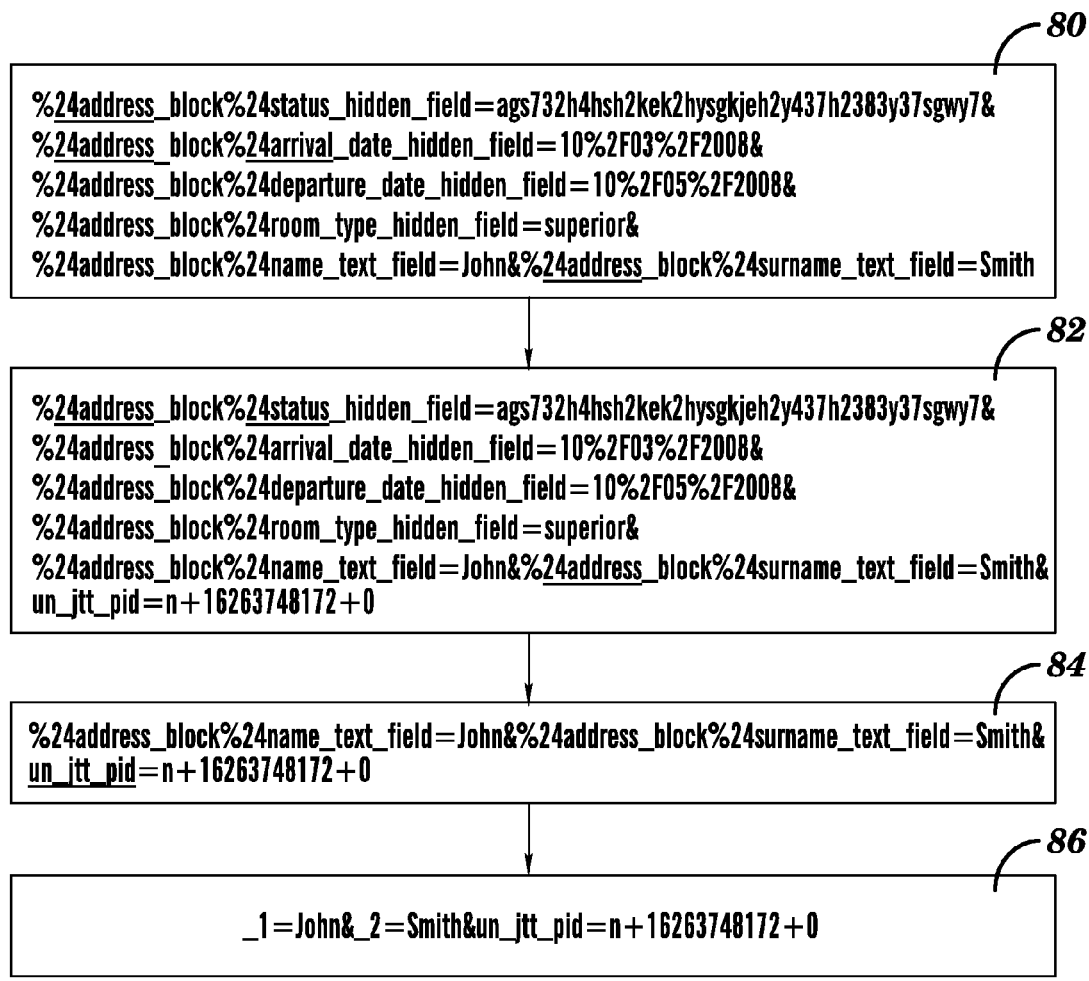
FIG. 7 is a diagram illustrating progressive changes to an exemplary HTTP request body when applying the method for optimizing a form of a website page in accordance with embodiments of the present invention.

Referring to FIG. 7, a diagram of changes to an exemplary HTTP request body when applying the method for optimizing a form of a website page in accordance with embodiments of the present invention. Block 80 illustrates the exemplary HTTP request body resulting from the submission of the original website page with the form. Block 82 illustrates the exemplary HTTP request body resulting from the submission of the original website page with the form after adding the un_jtt_pid parameter. Block 84 illustrates the exemplary HTTP request body after removing hidden field controls from the original form. Block 86 illustrates the exemplary HTTP request body after renaming remaining field controls.

Accordingly, as illustrated and described herein the present invention provides methods and systems to optimize interaction with a form in a website page with mobile and other devices with limited memory and network capabilities. The optimized form in the website page provided to these devices has substantially less markup code by removing hidden fields and shortening field control names from the form making them easier and quicker to load and process. Additionally, once fields in these optimized forms are completed with data, the resulting completed forms can more easily be transmitted back to complete the transaction step. With the present invention, these operations all take place quickly, seamlessly and without the knowledge of the end user.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for optimizing interaction with a form of a website page, the method comprising:
   retrieving, by a web content optimization computing device, an original website page in response to a request from a requesting system, wherein the retrieved original website page includes a form;
   storing, by the web content optimization computing device, at least the form from the original website page in a memory;
   adding, by the web content optimization computing device, a form identifier in the original website page, wherein the form identifier is an identifier to locate at least the stored form corresponding to the original website page;
   identifying, by the web content optimization computing device, one or more field controls in the form;
   adjusting, by the web content optimization computing device, the form of the original website page by renaming an initial name of at least one of the identified one or more field controls with a corresponding shortened name to generate a simplified website page
   providing, by the web content optimization computing device, to the requesting system the simplified website page, wherein the simplified website page includes the renamed at least one of the identified one or more field controls;
   receiving, by the web content optimization computing device, a HTTP request body from the requesting system in response to the simplified website page provided to the requesting system;
   determining, by the web content optimization computing device, when the received HTTP request body includes the added form identifier;
   locating and retrieving, by the web content optimization computing device, the stored form corresponding to the original website page from the memory based on the added form identifier when the determination indicates that the HTTP request body includes the added form identifier,
   transforming, by the web content optimization computing device, at least one parameter of the received HTTP request body based on the retrieved stored form; and
   providing, by the web content optimization computing device, the transformed HTTP request body to a source system of the original website page.

2. The method as set forth in claim 1 wherein the adjusting further comprises:
   removing, by the web content optimization computing device, the added form identifier from the HTTP request body upon locating the stored form from the original website page based on the added form identifier.

3. The method as set forth in claim 1 wherein the adjusting further comprises:
   identifying, by the web content optimization computing device, one or more remaining field controls in the form, wherein the one or more remaining controls are not displayable and not selectable; and
   removing, by the web content optimization computing device, the identified one or more remaining field controls.

4. The method as set forth in claim 1 further comprising:
   determining, by the web content optimization computing device, when the retrieved original website page includes the form;
   storing, by the web content optimization computing device, at least the form from the original website page, when the determination indicates that the retrieved original website page includes the form.

5. The method as set forth in claim 1 wherein the one or more field controls comprises one or more hidden field controls.

6. The method as set forth in claim 5 wherein the transforming further comprises:
   identifying, by the web content optimization computing device, one or more hidden field controls in the form;
   removing, by the web content optimization computing device, the identified one or more remaining field controls;
   identifying, by the web content optimization computing device, at least one hidden field control removed from the form upon receiving the HTTP request body; and
   adding, by the web content optimization computing device, the identified at least one hidden field control removed from the form as at least one additional parameter to the received HTTP request body.

7. The method as set forth in claim 6 wherein the transforming further comprises:
   replacing, by the web content optimization computing device, the shortened name of the renamed at least one of the one or more field controls in the HTTP request body with the corresponding initial name based on the retrieved stored form and provide the replaced initial name to a source system of the original website page.

8. A non-transitory computer readable medium having stored thereon instructions for optimizing interaction with a form of a website page comprising machine executable code which when executed by at least one processor, causes the processor to perform steps comprising:

retrieving an original website page in response to a request from a requesting system, wherein the retrieved original website page includes a form;

storing at least the form from the original website page in a memory;

adding a form identifier in the original website page, wherein the form identifier is an identifier to locate at least the stored form corresponding to the original website page;

identifying one or more field controls in the form;

adjusting the form of the original website page by renaming an initial name of at least one of the identified one or more field controls with a corresponding shortened name to generate a simplified website page providing to the requesting system the simplified website page, wherein the simplified website page includes the renamed at least one of the identified one or more field controls;

receiving a HTTP request body from the requesting system in response to the simplified website page provided to the requesting system;

determining when the received HTTP request body includes the added form identifier;

locating and retrieving the stored form corresponding to the original website page from the memory based on the added form identifier, when the determination indicates that the HTTP request body includes the added form identifier;

transforming at least one parameter of the received HTTP request body based on the retrieved stored form; and providing the transformed HTTP request body to a source system of the original website page.

9. The medium as set forth in claim 8 further having stored thereon instructions that when executed by the processor cause the processor to perform steps for the adjusting further comprising:

removing the added identifying field control from the HTTP request body upon locating the stored form from the original website page based on the added form identifier.

10. The medium as set forth in claim 8 further having stored thereon instructions that when executed by the processor cause the processor to perform steps for the adjusting further comprising:

identifying one or more remaining field controls in the form, wherein the one or more remaining controls are not displayable and not selectable; and removing the identified one or more remaining field controls.

11. The medium as set forth in claim 8 further having stored thereon instructions that when executed by the processor cause the processor to perform steps further comprising:

determining when the retrieved original website page includes the form;

storing at least the form from the original website page, when the determination indicates that the retrieved original website page includes the form.

12. The medium as set forth in claim 8 wherein the one or more field controls comprises one or more hidden field controls.

13. The medium as set forth in claim 12 further having stored thereon instructions that when executed by the processor cause the processor to perform steps for the transforming further comprising:

identifying one or more hidden field controls in the form;

removing the identified one or more remaining field controls;

identifying at least one hidden field control removed from the form upon receiving the HTTP request body; and adding the identified at least one hidden field control removed from the form as at least one additional parameter to the received HTTP request body.

14. The medium as set forth in claim 13 further having stored thereon instructions that when executed by the processor cause the processor to perform steps for the transforming further comprising:

replacing the shortened name of the renamed at least one of the one or more field controls in the HTTP request body with the corresponding initial name based on the retrieved stored form and provide the replaced initial name to a source system of the original website page.

15. A web content optimization computing device comprising:

one or more processors;

a memory coupled to the one or more processors which are configured to be capable of executing programmed instructions, which comprise the programmed instructions stored in the memory to:

retrieve an original website page in response to a request from a requesting system, wherein the retrieved original website page includes a form;

store at least the form from the original website page in a memory;

add a form identifier in the original website page, wherein the form identifier is an identifier to locate at least the stored form corresponding to the original website page;

identify one or more field controls in the form;

adjust the form of the original website page by renaming an initial name of at least one of the identified one or more field controls with a corresponding shortened name to generate a simplified website page provide to the requesting system the simplified website page, wherein the simplified website page includes the renamed at least one of the identified one or more field controls;

receive a HTTP request body from the requesting system in response to the simplified website page provided to the requesting system;

determine when the received HTTP request body includes the added form identifier;

locate and retrieve the stored form corresponding to the original website page from the memory based on the added form identifier, when the determination indicates that the HTTP request body includes the added form identifier;

transform at least one parameter of the received HTTP request body based on the retrieved stored form; and provide the transformed HTTP request body to a source system of the original website page.

16. The device as set forth in claim 15 wherein the one or more processors are further configured to be capable of executing programmed instructions to adjust, which comprise the programmed instructions to adjust that are stored in the memory to:

remove the added identifying field control from the HTTP request body upon locating the stored form from the original website page based on the added form identifier.

17. The device as set forth in claim 15 wherein the one or more processors are further configured to be capable of executing programmed instructions to adjust, which comprise the programmed instructions to adjust that are stored in the memory to:

identify one or more remaining field controls in the form, wherein the one or more remaining controls are not displayable and not selectable; and remove the identified one or more remaining field controls.

18. The device as set forth in claim 15 wherein the one or more processors are configured to be capable of executing programmed instructions, which comprise the programmed instructions stored in the memory to:

determine when the retrieved original website page includes the form;

store at least the form from the original website page, when the determination indicates that the retrieved original website page includes the form.

19. The device as set forth in claim 15 wherein the one or more field controls comprises one or more hidden field controls.

20. The device as set forth in claim 19 wherein the one or more processors are further configured to be capable of executing programmed instructions to transform, which comprise the programmed instructions to transform that are stored in the memory to:

identify one or more hidden field controls in the form;

remove the identified one or more remaining field controls;

identify at least one hidden field control removed from the form upon receiving the HTTP request body; and add the identified at least one hidden field control removed from the form as at least one additional parameter to the received HTTP request body.

21. The device as set forth in claim 20 wherein the one or more processors are further configured to be capable of executing programmed instructions to transform, which comprise the programmed instructions to transform that are stored in the memory to:

replace the shortened name of the renamed at least one of the one or more field controls in the HTTP request body with the corresponding initial name based on the retrieved stored form and provide the replaced initial name to a source system of the original website page.

* * * * *